(12) United States Patent
Yanai

(10) Patent No.: US 8,523,399 B2
(45) Date of Patent: Sep. 3, 2013

(54) ILLUMINATION APPARATUS

(75) Inventor: Junichi Yanai, Chigasaki (JP)

(73) Assignee: Nikon Corporation, Tokyo (JP)

( * ) Notice: Subject to any disclaimer, the term of this patent is extended or adjusted under 35 U.S.C. 154(b) by 255 days.

(21) Appl. No.: 12/907,242

(22) Filed: Oct. 19, 2010

(65) Prior Publication Data

US 2011/0090695 A1 Apr. 21, 2011

(30) Foreign Application Priority Data

Oct. 21, 2009 (JP) .................................. 2009-241961

(51) Int. Cl.
*F21S 8/00* (2006.01)
(52) U.S. Cl.
USPC ............ 362/277; 362/508; 362/512; 362/523
(58) Field of Classification Search
USPC .......................... 362/277, 508, 512, 523, 530
See application file for complete search history.

(56) References Cited

FOREIGN PATENT DOCUMENTS

| JP | 60-083921 | 5/1985 |
|---|---|---|
| JP | A-02-124547 | 5/1990 |
| JP | A-09-189942 | 7/1997 |
| JP | A-2005-078011 | 3/2005 |
| JP | A-2007-199167 | 8/2007 |

OTHER PUBLICATIONS

Notice of Reasons for Rejection issued in Japanese Application No. 2009-241961 transmitted on Feb. 21, 2012 (with translation).
Jul. 10, 2012 Japanese Office Action issued in Application No. 2009-241961 (with translation).
Jan. 15, 2013 Office Action issued in Japanese Patent Application No. 2009-241961 (with translation).

*Primary Examiner* — Evan Dzierzynski
(74) *Attorney, Agent, or Firm* — Oliff & Berridge, PLC

(57) ABSTRACT

An illumination apparatus including a light source that emits illumination light, an optical member that transmits the illumination light to externally project the illumination light, and a reflector that reflects illumination light from the light source towards the optical member, the device comprising: a drive device to drive the reflector and the light source to advance and retract in a substantially perpendicular direction relative to a light projection surface of the optical member; and a relative movement device to cause the light source to relatively move relative to the reflector in a process of driving to advance and retract by way of the drive device, wherein the relative movement device includes a straight guide member that causes the light source to move straight ahead in the substantially perpendicular direction relative to the reflector.

4 Claims, 3 Drawing Sheets

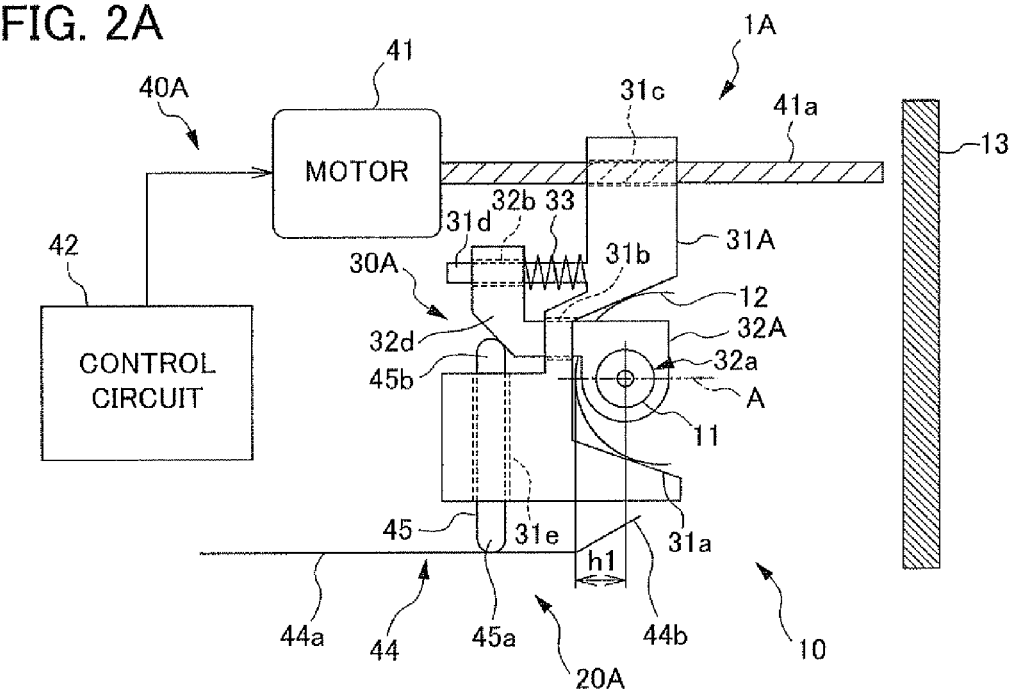
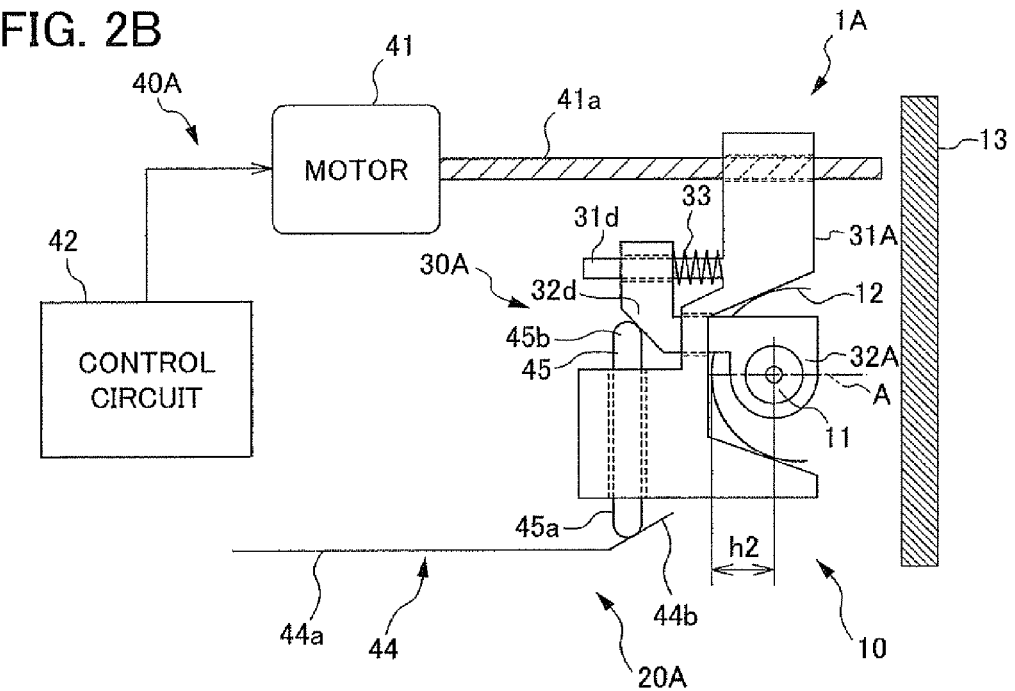

ILLUMINATION APPARATUS

The present application claims priority under 35 U.S.C. §119 to Japanese Patent Application No. 2009-241961 filed on Oct. 21, 2009. The content of the application is incorporated herein by reference in its entirety.

BACKGROUND OF THE INVENTION

1. Field of the Invention

The present invention relates to an illumination apparatus.

2. Description of the Related art

Conventionally, an illumination apparatus exists that can automatically change its illumination angle to correspond to the focal length of the photographic lens. As a conventional example relating to this type of illumination apparatus, a flash device has been known that is made so that the light source is configured to freely swing on an optical axis direction with the axis of rotation as the pivot point, and the positional relationship between the light source and a reflector changes by way of this swinging (for example, Japanese Patent No. 3022295).

SUMMARY OF THE INVENTION

With the above-mentioned conventional example, since the light source swings on an arc about the center of rotational axis, when the amount of movement of the light source increases, the position of the light source deviates greatly from the optical axis. When the position of the light source deviates greatly from the optical axis in this way, the light distribution becomes vertically unsymmetrical, and the vertical luminance of the image becomes non-uniform.

The problem of the present invention is to provide an illumination apparatus that can make the light distribution vertically symmetrical, irrespective of the amount of movement of the light source.

The present invention solves the problem by the following solution.

Accordingly, an object of the present invention is to provide an illumination apparatus including a light source that emits illumination light, an optical member that transmits the illumination light to externally project the illumination light, and a reflector that reflects illumination light from the light source towards the optical member, the device comprising: a drive device to drive the reflector and the light source to advance and retract in a substantially perpendicular direction relative to a light projection surface of the optical member; and a relative movement device to cause the light source to relatively move relative to the reflector in a process of driving to advance and retract by way of the drive device, wherein the relative movement device includes a straight guide member that causes the light source to move straight ahead in the substantially perpendicular direction relative to the reflector.

The drive device may include a light source retaining member that retains the light source, and a reflector retaining member that retains the reflector, may be a device to support the light source retaining member to be movable in the substantially perpendicular direct, and to drive the reflector retaining member to advance or retract in the substantially perpendicular direction, and may further include a cam face that is provided along a path in which the reflector retaining member is driven to advance or retract and has a sloped surface at a portion thereof, wherein the relative movement device may include a depressing member having one end that abuts with the light source retaining member and another end that abuts with the cam face, and controls a position of the light source retaining member in the substantially perpendicular direction by way of the depressing member abutting the light source retaining member and the cam face, and wherein the relative movement device may cause the light source to relatively move relative to the reflector when the drive device performs driving to advance or retract, by way of the depressing device moving while abutting the sloped surface of the cam face.

The depressing member may be supported to be rotatable about a predetermined axis of rotation, and wherein the depressing member may be set so as enter different rotational states when moving while abutting with the sloped surface of the cam face and when moving while abutting a non-sloped face of the cam face, and may cause the light source to relatively move relative to the reflector by way of abutting with the sloped surface or the non-sloped surface of the cam face.

The depressing member may be supported to be reciprocally movable in an orthogonal direction to the substantially perpendicular direction, and wherein the depressing member may be set so as to move in the orthogonal direction by different amounts when moving while abutting with the sloped surface of the cam face and when moving while abutting a non-sloped surface of the cam face, and may cause the light source to relatively move relative to the reflector by way of abutting with the sloped surface or the non-sloped surface of the cam face.

The drive device may include a light source retaining member that retains the light source, and a reflector retaining member that retains the reflector, and may be a device that retains the light source retaining member to be moveable in the substantially perpendicular direction and drives the reflector retaining member to advance or retract in the substantially perpendicular direction by way of driving power emitted by a first drive source, and wherein the relative movement device may be drive the light source retaining member to advance or retract in the substantially perpendicular direction independently from the drive device, by way of driving power emitted by a second drive source that is different from the first drive source.

According to the present invention, it is possible to provide an illumination apparatus that can make the light distribution vertically symmetrical irrespective of the amount of the movement of the light source.

BRIEF DESCRIPTION OF THE DRAWINGS

In the drawings attached,

FIG. 2A is block diagram of an illumination according to a second embodiment;

FIG. 2B is block diagram of an illumination apparatus according to a second embodiment;

DETAILED DESCRIPTION OF THE PREFERRED EMBODIMENT

Figure 1A:
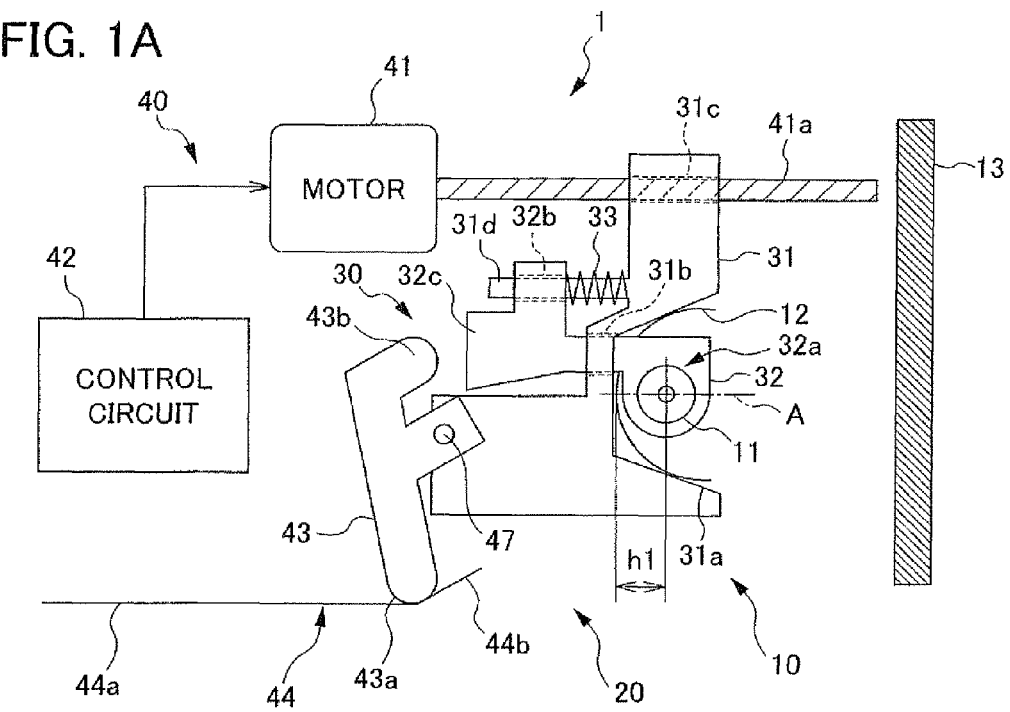
FIG. 1A is block diagram of an illumination apparatus according to a first embodiment.

Hereinafter, embodiments of an illumination apparatus according to the present invention will be explained while referring to the drawings. The illumination apparatus according to the present embodiments is mounted to a camera, which is not illustrated. The camera is provided with a camera body including an imaging unit that converts object light to electronic signals and outputs the electronic signals, and the like, and a photographic lens that captures the object light on a light receiving surface of the imaging unit. This photographic lens is a zoom lens having a focal length that is variable manually or electrically. The illumination apparatus according to the present embodiments is configured so as that the illumination angle automatically changes in accordance with the focal length of the photographic lens.

First Embodiment

Figure 1B:
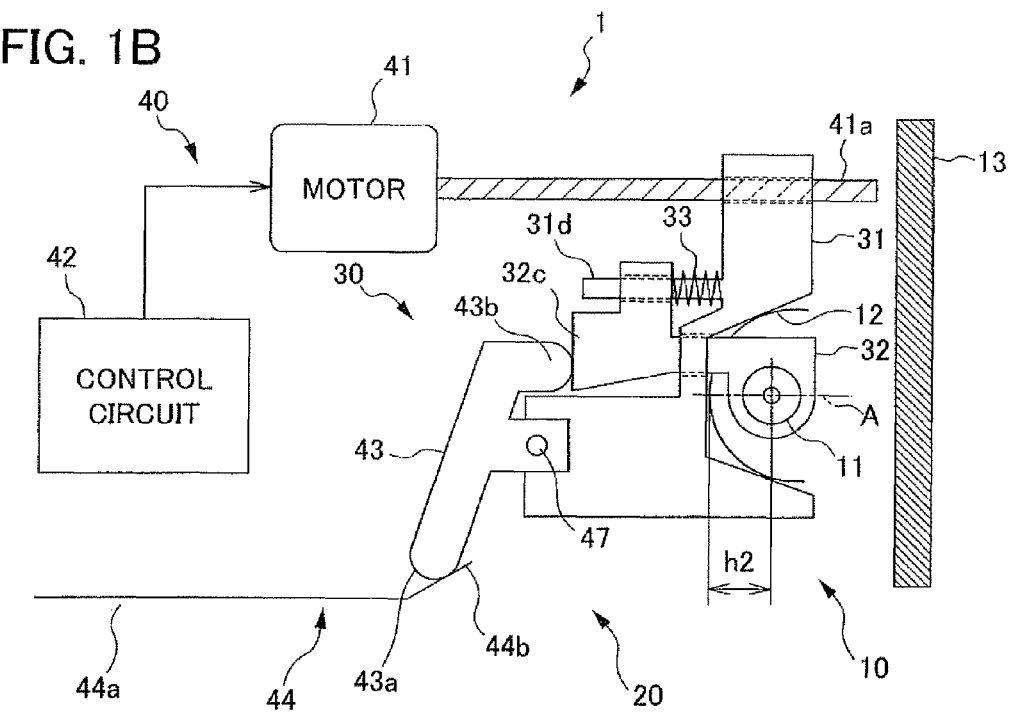
FIG. 1B is block diagram of an illumination apparatus according to a first embodiment.

FIGS. 1A and 1B are block diagrams showing an illumination apparatus 1 according to a first embodiment. FIG. 1A shows a configuration when a zoom mechanism 20 is positioned to a telephoto side, and FIG. 1B shows a configuration when positioned to a wide-angle side.

The illumination apparatus 1 according to the present embodiment is configured with a light source unit 10 and a zoom mechanism 20. The light source unit 10 includes a xenon tube 11, a reflector 12, and diffuser 13. The xenon tube 11 is a light source that generates illumination light, and is a light emission tube that illuminates by way of electric power being supplied from a capacitor, which is not illustrated, to emit illumination light. It should be noted that the light source is not limited to a xenon tube, and may be a light emitting diode, for example. In addition, illustrations and explanations for a boosting circuit for causing the xenon tube 11 to illuminate and the like are omitted. Moreover, the reference numbers are partly omitted in FIG. 1B.

The reflector 12 is a member that reflects illumination light from the xenon tube 11 towards the diffuser 13. This reflector 12 is retained by a reflector retaining portion 31a of a reflector holder 31 described later. In the present embodiment, the luminescent center of the xenon tube 11 and the reflection center of the reflector 12 are positioned on the optical axis A of the light source unit 10. This optical axis A is a line extending in a substantially perpendicular direction relative to a light projection surface of the diffuser 13 described later.

The diffuser 13 is an optical member that scatters illumination light from the xenon tube 11 and projects to outside. The diffuser 13 is disposed in an object direction (right-side direction in the figure) relative to the xenon tube 11, which is the light source. It should be noted that the diffuser 13 is configured by a transparent or semi-transparent resin material, and has a Fresnel lens, which is not illustrated, provided on the projection surface.

The zoom mechanism 20 is configured by the light source retaining portion 30 and a light source drive unit 40. The light source retaining portion 30 includes a reflector holder 31 and a xenon tube holder 32. The reflector holder 31 is a member that is driven to advance or retract in the direction of the optical axis A of the light source unit 10 by way of the light source drive unit 40 described later. The reflector holder 31 includes a reflector retaining portion 31a, a reflector holder engaging portion 31b, a drive shaft engaging portion 31c, and a straight guide member 31d.

The reflector retaining portion 31a is a concave shape having a cross-section formed in a substantially trapezoidal shape. The aforementioned reflector 12 is retained to the reflector retaining portion 31a. The reflector holder engaging portion 31b is a through-hole portion engaged by the reflector holder 31. The reflector holder 31 is supported to be movable along the optical axis A in a state of being engaged with the reflector holder engaging portion 31b.

The drive shaft engaging portion 31c is a threaded hole portion that engages with the drive shaft 41a of the light source drive unit 40, and has female threads formed in the inner circumference. The drive shaft 41a of the light source drive unit 40 has male threads formed on the outer circumference. The male threads of the drive shaft 41a of the light source drive unit 40 and the female threads of the drive shaft engaging portion 31c are mutually engaged. Rotation of the reflector holder 31 relative to the drive shaft 41a restricted by a member, which is not illustrated. The reflector holder 31 is driven to advance or retract in the direction of the optical axis A depending on the rotational direction of the drive shaft 41a. For example, it advances when the drive shaft 41a rotates in a clockwise direction, and retracts when rotating in the counterclockwise direction. The straight guide member 31d is a member that allows the xenon tube holder 32 retaining the xenon tube 11 to move straight ahead along the direction of the optical axis A relative to the reflector 12. The straight guide member 31d engages with an engaging portion 32b of the xenon tube holder 32 described later. A spring 33 is attached to the straight guide member 31d. The spring 33 is a member that biases the xenon tube holder 32 to the left side in the figure.

The xenon tube holder 32 is a member that causes the xenon tube 11 to be driven to advance or retract along the direction of the optical axis A. The xenon tube holder 32 includes a holder portion 32a that retains the xenon tube 11, an engaging portion 32b that engages with the straight guide member 31d of the reflector holder 31, and a depressed portion 32c. The engaging portion 32b is a through-hole portion engaged by the straight guide member 31d of the aforementioned reflector holder 31. The xenon tube holder 32 is locked to the left side in the figure by way of the biasing of the spring 33 when not being depressed by a drive lever 43 described later. At this time, the xenon tube 11 retained to the xenon tube holder 32 is at a position closest to the base portion of the reflector 12. The depressed portion 32c is a part that is depressed by a depressing portion 43b of the drive lever 43 described later.

The light source drive unit 40 includes a motor 41, a control circuit 42, a drive lever 43, and a cam face 44. The motor 41 is a drive source that produces driving power for driving the reflector holder 31. The motor 41 has the aforementioned drive shaft 41a. The drive shaft 41a engages with the drive shaft engaging portion 31c of the reflector holder 31.

The control circuit 42 is a circuit that controls rotation of the motor 41, and is configured by a microprocessor such as a CPU. The control circuit 42 causes the reflector holder 31 engaging with the drive shaft 41a of the motor 41 to be driven to advance or retract in the direction of the optical axis A by way of controlling rotation of the motor 41 in accordance with the focal length of the aforementioned photographic lens. In other words, the control circuit 42 causes the reflector holder 31 to retract along the direction of the optical axis A (move to the left side in the figure) when the focal length of the photographic lens, which is not illustrated, moves from the wide-angle side to the telephoto side, and causes the reflector holder 31 to advances along the direction of the optical axis A (move to the right side in the figure) when the focal length of the photographic lens moves from the telephoto side to the wide-angle side.

The drive lever 43 is a member that depresses the xenon tube holder 32 and controls the position thereof in the direction of the optical axis A. The drive lever 43 is attached to a rotating shaft 47 provided to the reflector holder 31. A spring, which is not illustrated and biases the drive lever 43 in the counterclockwise direction, is attached to the rotating shaft 47. The drive lever 43 is biased in the counterclockwise direction about the rotating shaft 47 by the spring, and is supported to be rotatable also in the clockwise direction about the rotating shaft 47. The drive lever 43 moves along the direction of the optical axis A along with the reflector holder 31.

The cam face 44 is a member provided along the path in which the reflector holder 31 is driven to advance and retract. The cam face 44 is disposed to be fixed inside of the illumination apparatus. In addition, the cam face 44 has a flat surface 44a, and a sloped surface 44b provided at one end thereof.

The drive lever 43 includes a sliding portion 43a on a lower end. The sliding portion 43a is a part that abuts with the cam face 44. The drive lever 43 moves while abutting with the flat surface 44a or sloped surface 44b of the cam face 44 with movement of the reflector holder 31. In addition, the drive lever 43 includes a depressing portion 43b at an upper end.

The drive lever 43 is biased in a counterclockwise direction about the rotating shaft 47 when the focal length of the photographic lens, which is not illustrated, moves from the wide-angle side to the telephoto side, due to the sliding portion 43a moving while abutting with the flat surface 44a of the cam face 44. At this time, the depressing portion 43b does not abut the depressed portion 32c of the xenon tube holder 32. As a result, the xenon tube holder 32 relatively moves to the left side in the figure relative to the reflector holder 31, by way of the biasing force of the spring 33.

In addition, the drive lever 43 rotates counterclockwise about the rotating shaft 47 when the focal length of the photographic lens, which is not illustrated, moves from the telephoto side to the wide-angle side, due to the sliding portion 43a moving while abutting with the sloped surface 44b of the cam face 44. At this time, the depressing portion 43b depresses the depressed portion 32c of the xenon tube holder 32 in the right direction in the figure against the biasing force of the spring 33. With this, the xenon tube holder 32 relatively moves to the right side in the figure relative to the reflector holder 31.

Next, operations during zoom driving of the illumination apparatus 1 configured in the above-mentioned way will be explained. When the zoom mechanism 20 moves from the wide-angle side to the telephoto side, the reflector holder 31 engaging with the drive shaft 41a of the motor 41 retracts along the direction of the optical axis A (moves to the left side in the figure) by way of control of the control circuit 42. At this time, the sliding portion 43a of the drive lever 43 moves while abutting with the flat surface 44a of the cam face 44, as shown in FIG. 1A. Herein, the sliding portion 43a of the drive lever 43 is biased in the counterclockwise direction by way of the spring, which is not illustrated, without torque being imparted from the cam face 44. At this time, a state is entered in which depressing to the depressed portion 32c of the xenon tube holder 32 by the drive lever 43 has been released.

With this, the xenon tube holder 32 engaging with the straight guide member 31d of the reflector holder 31 moves straight ahead to a side opposite the diffuser 13 along the direction of the optical axis A by way of the biasing force of the spring 33. As a result thereof, a space between the center of the xenon tube 11 and the base portion of the reflector 12 becomes h1.

On the other hand, when the zoom mechanism 20 moves from the telephoto side to the wide-angle side, the reflector holder 31 engaging with the drive shaft 41a of the motor 41 advances along the direction of the optical axis A (moves to the right side in the figure) by way of control of the control circuit 42. At this time, the sliding portion 43a of the drive lever 43 moves while abutting with the sloped surface 44b of the cam face 44, as shown in FIG. 1B. Herein, torque in the clockwise direction about the rotating shaft 47 is imparted to the sliding portion 43a of the drive lever 43 by way of the sloped surface 44b of the cam face 44. As a result, the drive lever 43 rotates clockwise against the biasing of the spring, which is not illustrated, and the depressing portion 43b of the drive lever 43 depresses the depressed portion 32c of the xenon tube holder 32 in the right direction in the figure against the biasing force of the spring 33.

With this, the xenon tube holder 32 engaging with the straight guide member 31d of the reflector holder 31 moves straight ahead along the direction of the optical axis A to the side of the diffuser 13. As a result thereof, the space between the center of the xenon tube 11 and the base portion of the reflector 12 becomes h2 (>h1).

According to the illumination apparatus of the aforementioned first embodiment, in both cases of when the zoom mechanism 20 moves from the wide-angle side to the telephoto side, and when moving from the telephoto side to the wide-angle side, the xenon tube holder 32 moves straight ahead along the straight guide member 31d of the reflector holder 31, when the xenon tube 11 relatively moves relative to the reflector 12. As a result, the position of the xenon tube 11, which is the light source, does not deviate from the optical axis A, irrespective of the amount of movement thereof. Therefore, the light distribution of the xenon tube 11 is vertically symmetrical both at the wide-angle side and the telephoto side, and the vertical luminance of the image is uniform.

In addition, according to the configuration of the present embodiment, the amount of relative movement of the xenon tube holder 32 relative to the reflector holder 31 can be controlled by appropriately selecting the length of the depressing portion 43b of the drive lever 43 in the direction of the optical axis A.

Second Embodiment

FIG. 2 is a block diagram of an illumination apparatus 1A according to a second embodiment. FIG. 2A shows a configuration when a zoom mechanism 20A is positioned to a telephoto side, and FIG. 2 shows a configuration when positioned to a wide-angle side. Hereinafter, for equivalent parts to the first embodiment, the same reference symbols are assigned, and explanations are omitted.

The zoom mechanism 20A of the present embodiment is configured by a light source retaining portion 30A and a light source drive unit 40A. The light source retaining portion 30A includes a reflector holder 31A and a xenon tube holder 32A. The reflector holder 31A includes a reflector retaining portion 31a, reflector holder engaging portion 31b, drive shaft engaging portion 31c, straight guide member 31d, and drive pin engaging portion 31e. The drive pin engaging portion 31e is a through-hole portion through which a drive pin 45 described later is inserted.

The xenon tube holder 32A includes a holder portion 32a, engaging portion 32b, and sloped portion 32d. The sloped portion 32d is a sloped surface that is abutted by a depressing portion 45b of the drive pin 45 described later. When the depressing portion 45b of the drive pin 45 moves upwards in the figure against the biasing force of the spring 33 while abutting with the sloped portion 32d, the xenon tube holder 32A is depressed in the right direction in the figure, which is orthogonal to the movement direction of the drive pin 45. In addition, when the depressing portion 45b of the drive pin 45 moves downwards in the figure while abutting with the sloped portion 32d, the xenon tube holder 32A is pressed back in the left direction in the figure, which is orthogonal to the movement direction of the drive pin 45, by way of the biasing force of the spring 33.

The light source drive unit 40 includes a motor 41, control circuit 42, cam face 44, and drive pin 45. The drive pin 45 is a member that depresses the xenon tube holder 32A to control the position in the direction of the optical axis A. The drive pin 45 is inserted in the drive pin engaging portion 31e of the reflector holder 31. In addition, a spring, which is not illustrated and biases the drive pin 45 downward in the figure, is provided to the drive pin 45. The drive pin 45 is biased downward in the figure by the spring, and is supported to reciprocally move freely in a direction orthogonal to the direction of the optical axis A.

The drive pin 45 includes a sliding portion 45a on a lower end. The sliding portion 45a is a part that abuts with the cam face 44. The drive pin 45 moves while abutting the flat surface 44a or sloped surface 44b of the cam face 44 with movement of the reflector holder 31. In addition, the drive pin 45 includes a depressing portion 45b on an upper end.

When the focal length of the photographic lens, which is not illustrated, moves from the wide-angle side to the telephoto side, the drive pin 45 has movement in an upward direction orthogonal to the direction of the optical axis A restricted by way of the biasing force of a spring, which is not illustrated, since the sliding portion 45a moves while abutting with the flat surface 44a of the cam face 44. As a result, the depressing portion 45b does not depress the sloped portion 32d of the xenon tube holder 32A. Therefore, the xenon tube holder 32A relatively moves to the left side in the figure relative to the reflector holder 31A, by way of the biasing force of the spring 33.

In addition, when the focal length of the photographic lens, which is not illustrated, moves from the telephoto side to the wide-angle side, the drive pin 45 moves only by a predetermined amount in the upward direction orthogonal to the direction of the optical axis A against the biasing force from the spring, which is not illustrated, since the sliding portion 45a moves while abutting with the sloped surface 44b of the cam face 44. As a result, the depressing portion 45b depresses the sloped portion 32d of the xenon tube holder 32A in the right direction in the figure against the biasing force of the spring 33. With this, the xenon tube holder 32A relatively moves to the right side in the figure relative to the reflector holder 31A.

Next, operations during zoom driving of the illumination apparatus 1A configured in the above-mentioned way will be explained. When the zoom mechanism 20A moves from the wide-angle side to the telephoto side, the reflector holder 31A engaging with the drive shaft 41a of the motor 41 retracts along the direction of the optical axis A (moves to the left side in the figure), by way of control of the control circuit 42. At this time, the sliding portion 45a of the drive pin 45 moves while abutting with the flat surface 44a of the cam face 44, as shown in FIG. 2A. Herein, the sliding portion 45a of the drive pin 45 is biased downward by a spring, which is not illustrated, due to force in the upward direction not being imparted from the cam face 44. At this time, a state is entered in which depressing to the sloped portion 32d of the xenon tube holder 32 by the drive pin 45 is released.

With this, the xenon tube holder 32A engaging with the straight guide member 31d of the reflector holder 31A moves straight ahead to a side opposite the diffuser 13 along the direction of the optical axis A. As a result thereof, the space between the center of the xenon tube 11 and the base portion of the reflector 12 becomes h1.

On the other hand, when the zoom mechanism 20A moves from the telephoto side to the wide-angle side, the reflector holder 31A engaging with the drive shaft 41a of the motor 41 advances along the direction of the optical axis A (moves to the right side in the figure) by way of control of the control circuit 42. At this time, the sliding portion 45a of the drive pin 45 moves while abutting with sloped surface 44b of the cam face 44, as shown in FIG. 2B. Herein, a force in the upward direction is imparted to the sliding portion 45a of the drive pin 45 by way of the sloped surface 44b of the cam face 44. As a result, the drive pin 45 moves in the upward direction against the biasing force of the spring, which is not illustrated, and the depressing portion 45b of the drive pin 45 depresses the sloped portion 32d of the xenon tube holder 32 in the right direction in the figure, against the biasing force of the spring 33.

With this, the xenon tube holder 32A engaging with the straight guide member 31d of the reflector holder 31A moves straight ahead to the side of the diffuser 13 along the direction of the optical axis A. As a result thereof, the space between the center of the xenon tube 11 and the base portion of the reflector 12 becomes h2 (>h1).

According to the illumination apparatus 1A of the aforementioned second embodiment, in both cases of when the zoom mechanism 20A moves from the wide-angle side to the telephoto side, and when moving from the telephoto side to the wide-angle side, the xenon tube holder 32A moves straight ahead along the straight guide member 31d of the reflector holder 31A, when the xenon tube 11 relatively moves relative to the reflector 12. As a result, the position of the xenon tube 11, which is the light source, does not deviate from the optical axis A, irrespective of the amount of movement thereof. Therefore, the light distribution of the xenon tube 11 is vertically symmetrical both at the wide-angle side and the telephoto side, and the vertical luminance of the image is uniform.

It should be noted that, according to the configuration of the present embodiment, the amount of relative movement of the xenon tube holder 32A relative to the reflector holder 31A can be controlled by appropriately selecting the length of the drive pin 45 and the slope of the sloped portion 32d of the xenon tube holder 32A.

Third Embodiment

Figure 3A:
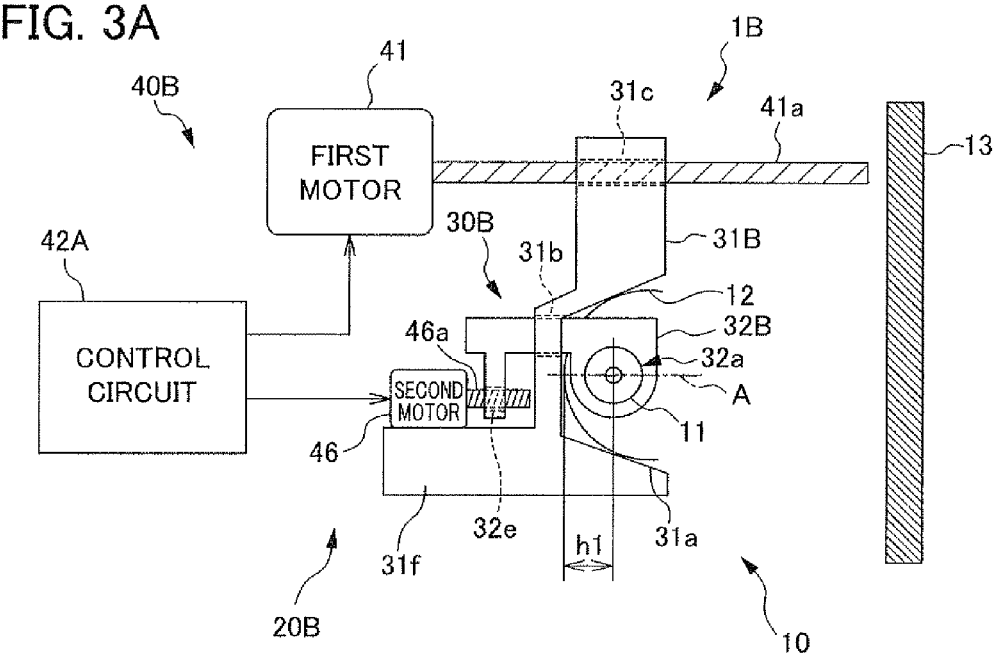
FIG. 3A is block diagram of an illumination apparatus according to a third embodiment and FIG. 3B is block diagram of an illumination apparatus according to a third embodiment.
Figure 3B:
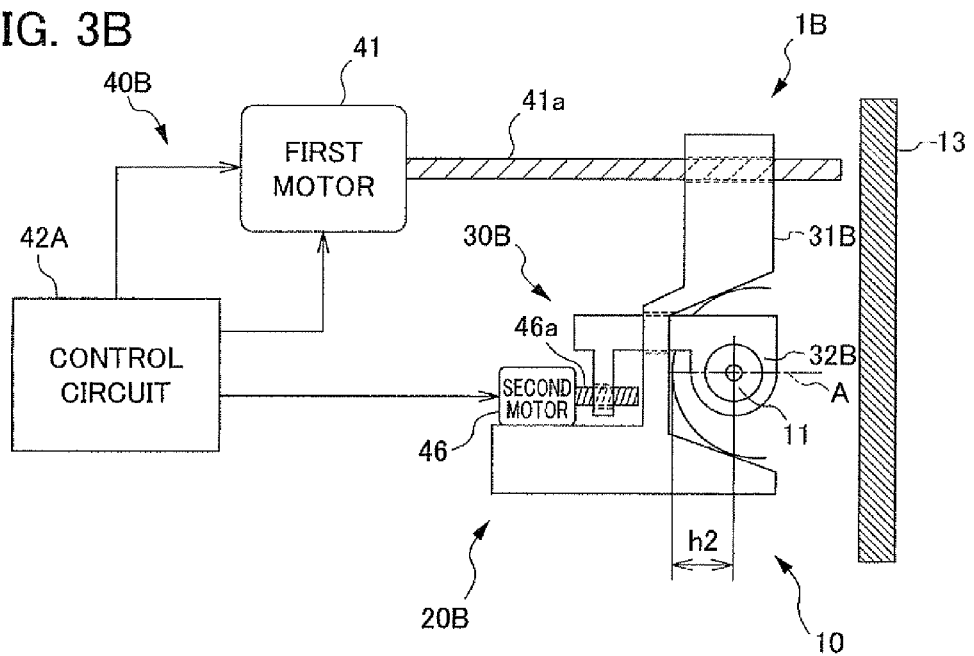

FIG. 3 is a block diagram of an illumination apparatus according to a third embodiment. FIG. 3A shows a configuration when a zoom mechanism 20B is positioned to a telephoto side, and FIG. 3B shows a configuration when positioned to a wide-angle side. Hereinafter, for equivalent parts to the first embodiment, the same reference symbols are assigned, and explanations are omitted.

A zoom mechanism 20B of the present embodiment is configured by a light source retaining portion 30B and a light source drive unit 40B. The light source retaining portion 30B includes a reflector holder 31B and a xenon tube holder 32B. The reflector holder 31B includes a reflector retaining portion 31a, reflector holder engaging portion 31b, drive shaft engaging portion 31c, and second motor fixing portion 31f. The second motor fixing portion 31f is a part that fixes a second motor 46 described later.

The xenon tube holder 32B includes a holder portion 32a and a drive shaft engaging portion 32e. The drive shaft engaging portion 32e is a threaded hole portion that engages with the drive shaft 46a of the second motor 46 described later, and has female threads formed in the inner circumference.

The light source drive unit 40B includes a first motor 41, control circuit 42A, and second motor 46. The first motor 41 is a first drive source that produces driving power for driving the reflector holder 31B. It should be noted that, although described as a "first motor" in order to distinguish from the "second motor" in the present embodiment, the first motor 41 is the motor 41 of the first and second embodiments. The second motor 46 is a second drive source that produces driving power for driving the xenon tube holder 32B. The second motor 46 includes the aforementioned drive shaft 46a. The drive shaft 46a engages with the drive shaft engaging portion 32e of the xenon tube holder 32B. In the present embodiment, the drive shaft 46a of the second motor 46 functions as a straight guide member that causes the xenon tube 11, which is the light source, to move straight ahead in the direction of the optical axis A relative to the reflector 12.

The control circuit 42A is a circuit that controls rotation of the first motor 41 and the second motor 46, and is configured by a microprocessor such as a CPU. The control circuit 42A causes the reflector holder 31B engaging with the drive shaft 41a of the first motor 41 to be driven to advance or retract in the direction of the optical axis A by way of controlling rotation of the first motor 41 in accordance with the focal length of the aforementioned photographic lens. In addition, the control circuit 42A causes the xenon tube holder 32B engaging with the drive shaft 46a of the second motor 46 to be driven to advance or retract in the direction of the optical axis A by way of controlling rotation of the second motor 46 in accordance with the focal length of the aforementioned photographic lens.

In other words, the control circuit 42A causes the reflector holder 31B to retract along the direction of the optical axis A (move to the left side in the figure) when the focal length of the photographic lens, which is not illustrated, moves from the wide-angle side to the telephoto side, by way of controlling rotation of the first motor 41. In addition, the control circuit 42A simultaneously causes the xenon tube holder 32B to retract along the direction of the optical axis A (move to the left side in the figure) by way of controlling rotation of the second motor 46. With this, the xenon tube holder 32B relatively moves to the left side in the figure relative to the reflector holder 31B.

In addition, the control circuit 42A causes the reflector holder 31B to advance along the direction of the optical axis A (move to the right side in the figure) when the focal length of the photographic lens, which is not illustrated, moves from the telephoto side to the wide-angle side, by way of controlling rotation of the first motor 41. In addition, the control circuit 42A simultaneously causes the xenon tube holder 32B to advance along the direction of the optical axis A (move to the right side in the figure) by way of controlling rotation of the second motor 46. With this, the xenon tube holder 32B relatively moves to the right side in the figure relative to the reflector holder 31B.

Next, operations during zoom driving of the illumination apparatus 1B configured in the above-mentioned way will be explained. The reflector holder 31B engaging with the drive shaft 41a of the first motor 41 retracts along the direction of the optical axis A (moves to the left side in the figure) when the zoom mechanism 20B moves from the wide-angle side to the telephoto side, by way of control of the control circuit 42A. At this time, the xenon tube holder 32B engaging with the drive shaft 46a of the second motor 46 retracts along the direction of the optical axis A (moves to the left side in the figure) by way of control of the control circuit 42A, as shown in FIG. 3A. As a result thereof, the space between the center of the xenon tube 11 and the base portion of the reflector 12 becomes h1.

On the other hand, when the zoom mechanism 20B moves from the telephoto side to the wide-angle side, the reflector holder 31B engaging with the drive shaft 41a of the first motor 41 advances along the direction of the optical axis A (moves to the right side in the figure) by way of control of the control circuit 42A. At this time, the xenon tube holder 32B engaging with the drive shaft 46a of the second motor 46 moves straight ahead to the side of the diffuser 13 along the same direction of the optical axis A by way of control of the control circuit 42A, as shown in FIG. 3B. As a result thereof, the space between the center of the xenon tube 11 and the base portion of the reflector 12 becomes h2 (>h1).

According to the illumination apparatus 1B of the aforementioned third embodiment, in both cases of when the zoom mechanism 208 moves from the wide-angle side to the telephoto side, and when moving from the telephoto side to the wide-angle side, the xenon tube holder 32B moves straight ahead along the drive shaft 46a of the second motor 46, when the xenon tube 11 relatively moves relative to the reflector 12. As a result, the position of the xenon tube 11, which is the light source, does not deviate from the optical axis A, irrespective of the amount of movement thereof. Therefore, the light distribution of the xenon tube 11 is vertically symmetrical both at the wide-angle side and the telephoto side, and the vertical luminance of the image is uniform.

According to the present embodiment, the amount of relative movement of the xenon tube holder 32B relative to the reflector holder 31B can be controlled by appropriately setting the drive amount of the second motor 46 in the control circuit 42A.

Modifications

Not being limited to the embodiments explained above, various modifications and alterations of the present invention are possible as shown below, and are also within the scope of the present invention.

(1) In each of the embodiments, it may be configured so that driving of the motor is performed by way of a control circuit of the camera to which the illumination apparatus is mounted.

(2) In the first (or second) embodiment, the amount of relative movement of the xenon tube holder 32 relative to the reflector holder 31 can change by way of appropriately selecting the sloped surface 44b of the cam face 44. In other words, the slope of the sloped surface 44b may relax or be made steep, and different slopes may be combined, depending on the amount of movement of the xenon tube holder 32. Furthermore, the sloped surface 44b may be made a curve (convex curve or concave curve).

(3) The drive lever 43 of the first embodiment or the drive pin 45 of the second embodiment may be configured so as to be driven using an actuator, which is not illustrated.

(4) In the third embodiment, rotation of the first motor 41 and second motor 46 is not limited to being controlled by one control circuit, and may be controlled by control circuits corresponding to the individual motors.

(5) The illumination apparatus according to the present invention is not only an external illumination apparatus mounted to a camera, and can also be applied to a built-in illumination apparatus of a camera. In addition, it is not only an illumination apparatus for a digital camera, and can also be applied as an illumination apparatus of a video camera.

Moreover, each of the above-mentioned embodiments and modifications can be used in combination as appropriate; however, detailed explanations thereof are omitted due to the configurations of each embodiment being clear from the drawings and explanations. Furthermore, the present invention is not to be limited by the embodiments explained above.

What is claimed is:

1. An illumination apparatus including a light source that emits illumination light, an optical member that transmits the illumination light to externally project the illumination light, and a reflector that reflects illumination light from the light source towards the optical member, the device comprising:
   a drive device to drive the reflector and the light source to advance and retract in a first direction substantially perpendicular to a light projection surface of the optical member, the drive device including: (a) a light source retaining member that retains the light source, (b) a reflector retaining member that retains the reflector, and (c) a cam face that is provided along a path in which the reflector retaining member is driven to advance or retract and has a sloped surface at a portion thereof, the drive device (i) supporting the light source retaining member to be movable in the first direction, and (ii) driving the reflector retaining member to advance or retract in the first direction; and
   a relative movement device to cause the light source to relatively move relative to the reflector in a process of driving to advance and retract by way of the drive device, the relative movement device including: (1) a depressing member having one end that abuts with the light source retaining member and another end that abuts with the cam face, and (2) a straight guide member that causes the light source to move straight ahead in a second direction substantially perpendicular to the reflector, the relative movement device controlling a position of the light source retaining member in the first direction by way of the depressing member abutting the light source retaining member and the cam face, the relative movement device causing the light source to relatively move relative to the reflector when the drive device performs driving to advance or retract, by way of the depressing device moving while abutting the sloped surface of the cam face.

2. The illumination apparatus according to claim 1, wherein the depressing member is supported to be rotatable about a predetermined axis of rotation, and
wherein the depressing member is set so as enter different rotational states when moving while abutting with the sloped surface of the cam face and when moving while abutting a non-sloped face of the cam face, and causes the light source to relatively move relative to the reflector by way of abutting with the sloped surface or the non-sloped surface of the cam face.

3. The illumination apparatus according to claim 1, wherein the depressing member is supported to be reciprocally movable in an orthogonal direction to the first direction, and
wherein the depressing member is set so as to move in the orthogonal direction by different amounts when moving while abutting with the sloped surface of the cam face and when moving while abutting a non-sloped surface of the cam face, and causes the light source to relatively move relative to the reflector by way of abutting with the sloped surface or the non-sloped surface of the cam face.

4. The illumination apparatus according to claim 1, wherein the drive device includes a light source retaining member that retains the light source, and a reflector retaining member that retains the reflector, and is a device that retains the light source retaining member to be moveable in the first direction and drives the reflector retaining member to advance or retract in the first direction by way of driving power emitted by a first drive source, and
wherein the relative movement device drives the light source retaining member to advance or retract in the first direction independently from the drive device, by way of driving power emitted by a second drive source that is different from the first drive source.

* * * * *